US009330083B2

(12) United States Patent
Tseng et al.

(10) Patent No.: US 9,330,083 B2

(45) **Date of Patent: *May 3, 2016**

(54) CREATING CUSTOMIZED USER DICTIONARY

(75) Inventors: Erick Tseng, San Francisco, CA (US); Shaheen Ashok Gandhi, Seattle, WA (US); Adam D. I. Kramer, San Francisco, CA (US); Luke St. Clair, Redmond, WA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,569

(22) Filed: Feb. 14, 2012

(65) Prior Publication Data

US 2013/0211825 A1 Aug. 15, 2013

(51) Int. Cl.
*G06F 17/21* (2006.01)
*G06F 17/27* (2006.01)

(52) U.S. Cl.
CPC .................................. *G06F 17/2735* (2013.01)

(58) Field of Classification Search
CPC combination set(s) only.
See application file for complete search history.

(56) References Cited

U.S. PATENT DOCUMENTS 7,043,450 B2 5/2006 Velez
7,260,568 B2 8/2007 Zhang
7,295,996 B2 11/2007 Skinner
7,428,529 B2 9/2008 Zeng
7,711,542 B2 * 5/2010 Fux ...................... G06F 17/289 341/22
8,311,796 B2 * 11/2012 Kristensson .......... G06F 3/0237 704/1
2001/0029455 A1 * 10/2001 Chin ..................... G06F 17/273 704/277
2003/0105677 A1 6/2003 Skinner
2003/0220918 A1 11/2003 Roy
2004/0030543 A1 * 2/2004 Kida ................... G06F 17/2223 704/8
2005/0198023 A1 * 9/2005 James ................... G06F 3/0236
2005/0234972 A1 10/2005 Zeng
2006/0149557 A1 * 7/2006 Kaneko ................. G06F 17/273 704/277
2008/0167858 A1 * 7/2008 Christie ................ G06F 3/0237 704/10
2009/0019002 A1 * 1/2009 Boulis ................. G06F 17/3064
2009/0306969 A1 * 12/2009 Goud .................... G06F 17/276 704/10
2010/0082324 A1 * 4/2010 Itagaki ................ G06F 17/2836 704/2
2010/0114887 A1 * 5/2010 Conway ................ G06F 3/0237 707/737
2010/0125569 A1 * 5/2010 Nair .................. G06F 17/30864 707/722
2010/0131507 A1 5/2010 Pradhan
2010/0185438 A1 * 7/2010 De La Cruz ........ G06F 17/2735 704/10
2011/0314001 A1 * 12/2011 Jacobs ............. G06F 17/30672 707/722

(Continued)

FOREIGN PATENT DOCUMENTS

CN 101470732 A * 7/2009 ............. G06F 17/30
CN 101470732 A * 7/2009

(Continued)

OTHER PUBLICATIONS

U.S. Appl. No. 13/396,559, filed Feb. 14, 2012, Tseng.

(Continued)

*Primary Examiner* — Richemond Dorvil
*Assistant Examiner* — Thuykhanh Le
(74) *Attorney, Agent, or Firm* — Kacvinsky Daisak Bluni, PLLC

(57) ABSTRACT

In one embodiment, collecting a plurality of words from texts submitted by one or more users; for each of a plurality of communication categories, determining a usage frequency of each of one or more of the words within the communication category based on the texts; and constructing one or more customized dictionaries that each comprise a different blending of selected words.

20 Claims, 3 Drawing Sheets

COLLECT WORDS FROM TEXTS SUBMITTED BY USERS THROUGH VARIOUS COMMUNICATION CHANNELS — 210

ANALYZE WORDS BASED ON CHANNELS AND DIMENSIONS — 220

SORT WORDS IN EACH CHANNEL-DIMENSION ACCORDING TO USAGE FREQUENCY — 230

CREATE CUSTOMIZED DICTIONARIES BY BLENDING WORDS FROM VARIOUS CHANNELS AND DIMENSIONS — 240

(56) References Cited

U.S. PATENT DOCUMENTS

2012/0053935 A1* 3/2012 Malegaonkar .......... G10L 15/07 704/235
2012/0331064 A1* 12/2012 Deeter .................. G06Q 50/01 709/206
2013/0046544 A1* 2/2013 Kay .................... G06F 3/04883 704/275
2013/0085747 A1* 4/2013 Li ....................... G06F 17/2735 704/10
2013/0158987 A1* 6/2013 Xing ..................... G06F 17/276 704/10

FOREIGN PATENT DOCUMENTS

CN 101470732 A * 7/2009 .............. G06F 17/30
EP 1527398 B1 * 7/2003 .............. G06F 17/27
WO WO 2008120033 A1 * 3/2007

OTHER PUBLICATIONS

U.S. Appl. No. 13/396,533, filed Feb. 14, 2012, Tseng.
U.S. Appl. No. 13/396,530, filed Feb. 14, 2012, Tseng.
Office Action for U.S. Appl. No. 13/396,530, filed Jun. 28, 2013.

* cited by examiner

CREATING CUSTOMIZED USER DICTIONARY

TECHNICAL FIELD

This disclosure generally relates to customized user dictionaries.

BACKGROUND

Dictionaries are an indispensable tool that helps people improve their speech and writing. In the electronic age, dictionaries provide even more benefits to electronic-device users. For example, many software applications, whether desktop based or web based, support features such as spell and grammar checking, automatic spelling correction, automatic word completion, and common phrase suggestion by utilizing electronic dictionaries.

DESCRIPTION OF EXAMPLE EMBODIMENTS

An electronic dictionary includes a collection of words. Many software applications, whether desktop based or web based, support functionalities such as spell and grammar checking, automatic spelling correction, automatic word completion, and common phrase suggestion by utilizing electronic dictionaries. However, existing dictionaries have several short-comings. As an example, each dictionary typically focuses on a specific language (e.g., an English dictionary includes a collection of English words; a Chinese dictionary includes a collection of English words; and an Arabic dictionary includes a collection of Arabic words). And yet, with globalization and the Internet, electronic-device users often mix words from multiple languages. As a result, single-language dictionaries become increasingly inadequate. As another example, there is no or very little user customization for dictionaries (e.g., in terms of what words are included in a dictionary). Often, each software application uses one standard dictionary for all of its users. Even when a software application (e.g., Microsoft Word) enables its users to add specific words to the standard dictionary provided by the application, the process is inefficient (e.g., a user must manually add one word at a time to the standard dictionary, and the customized dictionary is not easily portable).

Figure 1:
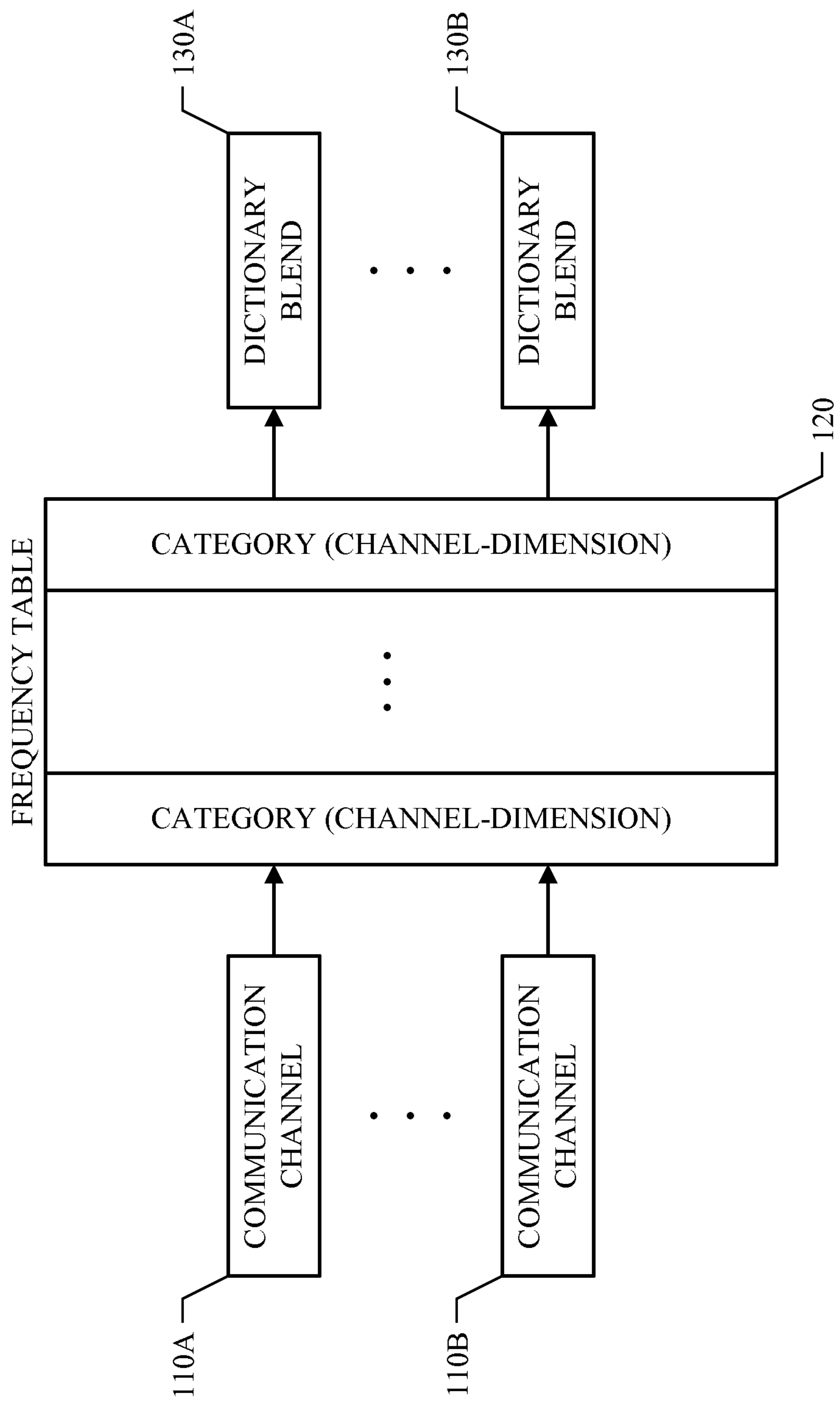
FIG. 1 illustrates an example system for creating customized dictionaries.
Figures 2, 3:
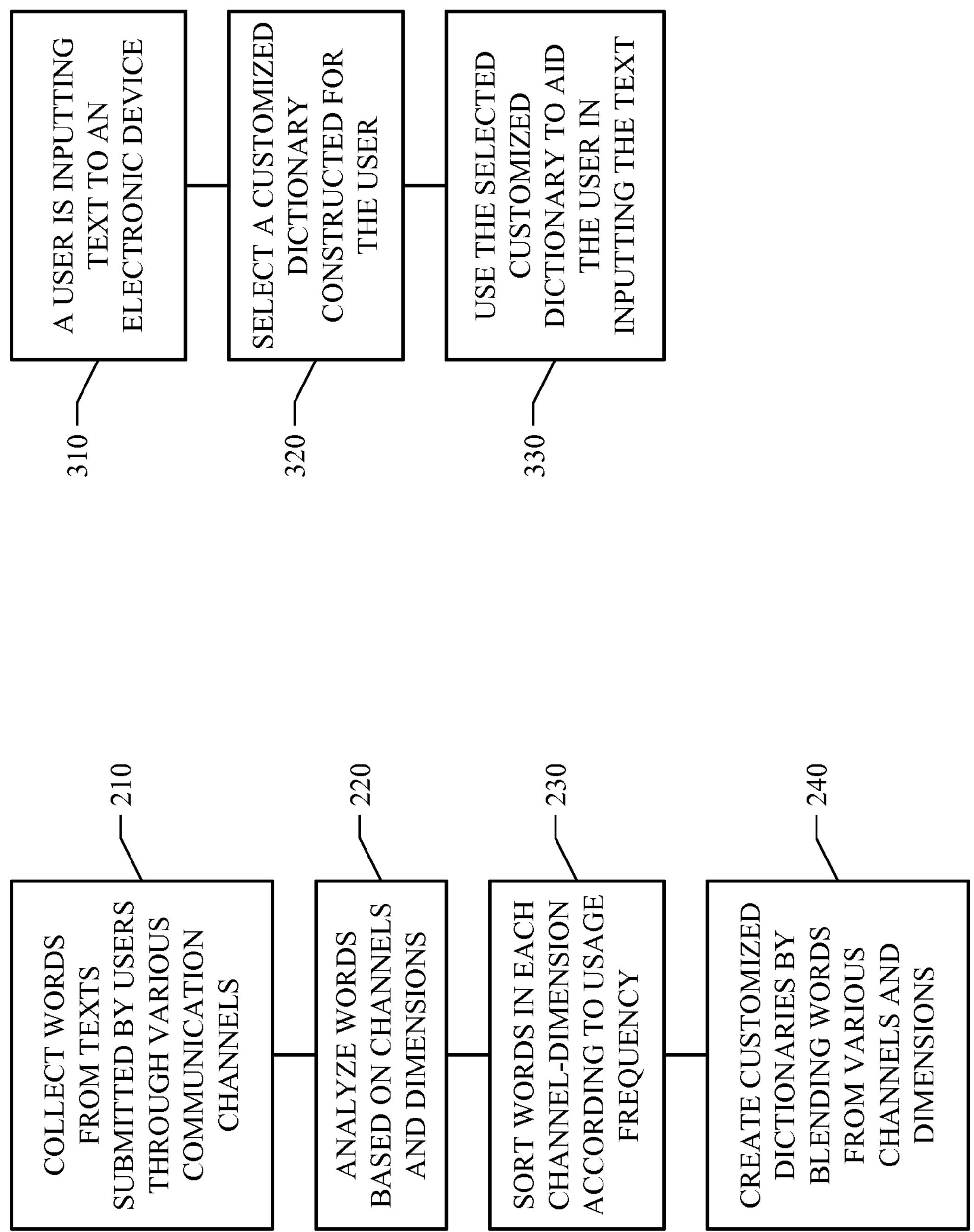
FIG. 2 illustrates an example method for creating customized dictionaries.
FIG. 3 illustrates an example method for utilizing customized dictionaries in aiding a user in inputting texts.

To address some of these problems, in particular embodiments, customized dictionaries are constructed for individual users or groups of users or for different communication channels. Words are collected from texts submitted by electronic-device users through various communication channels. The usage of these words are analyzed for different communication categories; and for each communication category, the words are sorted based on their respective usage frequencies in that communication category. Electronic dictionaries are constructed by blending some of the frequently used words in at least some of the communication categories. Different dictionaries may be constructed by blending the words differently. FIG. 1 illustrates an example system for creating customized dictionaries. FIG. 2 illustrates an example method for creating customized dictionaries. These two figures are described in association with each other.

As a user performs activities with his or her electronic device, the user frequently submits texts (e.g., as input) through the electronic device. The electronic device, in this case, may be considered an input device, and may have any applicable form, such as, for example and without limitation, mobile device (e.g., mobile telephone, notebook or tablet computer, etc.), desktop computer, game console, and personal digital assistant (PDA). Similarly, the texts may have any applicable form and submitted for any applicable purpose, such as, for example and without limitation, e-mail, chat, post, comment, status update, tweet, and search query.

More generally, users may submit texts through any number of communication channels 110. In particular embodiments, each communication channel 110 may be characterized by any number of applicable features such as, for example and without limitation, the object being used for the communication, the input device used for submitting the texts (e.g., mobile device, non-mobile device, etc.), and the text input itself. In particular embodiments, each communication channel 110 may be further characterized by any number of applicable dimensions such as, for example and without limitation, locale (e.g., the locale of the user submitting the texts), language (e.g., the language of the texts), geography (e.g., the location of the user when submitting the texts), culture (e.g., the cultural background of the user), the form or method of the communication (e.g., chat, message, comment, post, status update, etc.), and the intended recipient of the communication (e.g., communication to the general public or communication to specific individuals such as the user's friends and families).

Thus, given a specific text communication submitted by a specific user through a specific communication channel, the communication channel may indicate characteristics about the text such as the object used for the communication, the type of input device used by the user to submit the text (e.g., whether the input device is a mobile or non-mobile device, whether the input device has a full keyboard), the form or method of the communication, the language of the text, the locale, geography, or cultural background of the user, the recipient of the communication, and so on. In particular embodiments, words from texts submitted by various users through various communication channels 110 are collected, as illustrated in STEP 210. In some implementations, the input devices used by the users to submit texts may be online or offline. If an input device is online, the words may be collected from the text input as soon as the user submits them. If an input device is offline, the words may be collected subsequently (e.g., after the input device is connected to a network).

For each communication channel 110 from which texts are collected, the usage frequency of the individual words (i.e., how often a word is used in the texts) is analyzed along each dimension of each communication channel 110, as illustrated in STEP 220. For clarification purposes, each communication channel-dimension is referred to as a communication category.

As an example, suppose that the word "iPhone" has been found in the texts submitted by the users. The usage frequency of the word "iPhone" may be determined for each communication category (i.e., each unique channel-dimension). For example, in terms of communication form, the word "iPhone" may be used more frequently in chats than in e-mails or more frequently in comments than in tweets. In terms of user's geography location, the word "iPhone" may be used more frequently by users located in California than by users located in Montana. In terms of input device, the words "iPhone" may be used more frequently by users using mobile telephones than by users using desktop computers. In terms of user's cultural background, the words "iPhone" may be used more frequently by younger users (e.g., ages 16 to 35) than by older users (e.g., ages 60 and older).

As another example, with modern electronic communication, shorthand or word abbreviation is favored especially by mobile device (e.g., mobile telephone) users. Suppose that the word "lol" (abbreviation for "laughing out loud") has been found in the texts submitted by the users. Again, the usage frequency of the word "lol" may be determined for each communication category. For example, in terms of language, the word "lol" may be used more frequently by English-speaking users than by non-English-speaking users. In terms of input device, the words "lol" may be used more frequently when the texts are submitted through mobile telephones.

In particular embodiments, for each word collected, the stem of the word is considered. For example, for "wait", "waits", "waited", and "waiting", the stem is "wait". For "relate", "related", "relationship", and "relating", the stem is "relate". In some implementations, when determining the usage frequency of a word, those words sharing the same stem may be considered the same word.

In particular embodiments, certain undesirable words may be filtered out and discarded. For example, swearing words in various languages, words or abbreviations that are offensive, words or abbreviations that may make people uncomfortable, or misspelled words may be discarded. In particular embodiments, certain desirable words may be added. For example, popular website names (e.g., Facebook, Google, Yahoo, Amazon, Flickr, Twitter) or product names (e.g., iPad, iPhone, Xbox, Play Station) or trendy terms or abbreviations (e.g., omg, LQTM) may be added.

In particular embodiments, for each communication category, the words are sorted according to their respective usage frequencies in that communication category, as illustrated in STEP 230. In some implementations, a frequency table 120 may be constructed, which may include any number of applicable communication categories (e.g., determined based on communication channels and dimensions). For each communication category, the usage frequencies of the words collected from the texts submitted by the users may be stored in frequency table 120.

In particular embodiments, customized dictionaries 130 may be created by blending the words from some or all of the communication categories, as illustrated in STEP 240. In some implementations, only the more frequently used words from each communication category are used to create the customized dictionaries. For example, the top n (e.g., n=25,000) most frequently used words from each communication category are blended.

In particular embodiments, different customized dictionaries may be created by blending the words from various communication categories differently. A customized dictionary may be created for each individual user or group of users (in which case the same customized dictionary is used for every user in the group). Similarly, a customized dictionary may be created for each communication channel, each type of input device, each form of communication, and so on. For example, a customized dictionary may be created for comments, while another customized dictionary may be created for chats or instant messages. A customized dictionary may be created for use with mobile input devices, while another customized dictionary may be created for use with non-mobile devices. Different customized dictionaries may be created for users from different countries and thus speaking different language, or for users in different age groups, or for users in different professions, and so on. Different customized dictionaries may be created for different individual users as well. In addition, a specific user may have multiple customized dictionaries for use under different circumstances (e.g., different input devices, communication forms, and recipients).

In some implementations, coefficients may be used to determine the blending of the most frequently used words from various communication categories in order to construct a customized dictionary for a specific user or group of users. In particular embodiments, there may be any number of entities, also referred to as users, in existence. In this context, the term "user" is not limited to humans, but may include any type of entities, human or non-human (e.g., objects), real or virtual (e.g., web pages, digital files). In particular embodiments, the entities or users may exist anywhere. Individual users may interact with each other via the Internet. For example, a human may comment on a photo, post a message, share content with other humans, chat with another human, subscribe to a news group. Two humans may live in the same city, go to the same school, work at the same place, are members of the same family. Two messages may belong to the same thread. Two photos may belong to the same album or be submitted by the same human. The specific cases vary greatly. In particular embodiments, if there is any type of connection or association between two users, then the two users are considered to have interacted with each other.

In particular embodiments, the interactions between the individual users are monitored and collected for specific periods of time (e.g., during the past X number of days, such as the past 30, 60, or 90 days). In some implementations, the users and their interactions may be represented using a graph, which may include any number of nodes and edges. Each node represents a user (e.g., human or object). If there is an interaction between two users, then an edge connects the two corresponding nodes respectively representing the two users. In addition, for each edge, there may be associated data indicating how strong the interaction is between the two users represented by the nodes linked by the edge. Given two users, the information stored in the graph may be used to determine the affinity between the two users based on each user's historical activity. In some implementations, the affinity between two users may be computed using an affine function that include a number of coefficients. In some implementations, some or all of these coefficients may be determined through machine learning. More specifically, in some implementations, a supervised machine learning algorithm may be used with the training data obtained through farming, by providing a statistically significant number of users several options and monitoring their response. In other implementations, a supervised machine learning algorithm is trained entirely based on historical user activity and past responses to choices of actions.

In particular embodiments, coefficients may be similarly (e.g., through machine learning) determined in connection with words used by humans when inputting texts in various communication channels. In some implementations, a coefficient is associated with and determined for each communication category. Alternatively or in addition, in some implementations, a coefficient is associated with and determined for each word used to create the customized dictionaries. The blending of the most frequently used words from various communication categories may be adjusted by adjusting the coefficient values associated with the individual communication categories or the words in each communication category. In some implementations, when blending the words to create a customized dictionary for a user or a group of users, the coefficients of the communication category or words may be adjusted based on factors such as, for example and without limitations, the type of input devices, the language of the texts, the location and background of the users, and the form of communication for which the customized dictionaries are to be used. As an example, if a customized dictionary is created for use with mobile devices, it may include more shorthand or abbreviations. In addition, since communications sent through mobile device are often less formal, the customized dictionary for mobile devices may not include words such as "the", "a", etc. If a customized dictionary is created for teenage users, it may include more trendy or fashionable terms. If a customized dictionaries is created for a group of engineers, it may include more scientific or technical terms.

In particular embodiments, customized dictionaries may be created for users who are members of a social-networking website (e.g., www.facebook.com). Each user may have his or her personal social connections (e.g., friends and families, co-workers) with the social-networking website. A customized dictionary may be created for each individual user, and may include the names of that user's social connections. In fact, customized dictionaries may be created at any level of granularity. For example, given a specific user, one customized dictionary may be created for this user for use with his mobile telephone to send instant messages to his personal friends and families, while another customized dictionary may be created for this user for use with his desktop computer to send e-mails to his colleagues and professional associates. A third customized dictionary may be created for this user specifically for use in communication with his father. The coefficients associated with the words may be adjusted based on the social information of the users maintained with the social-networking website. Such social information may include, for example and without limitation, the social connections among the users (e.g., the degree of separation between two users) and the actions taken by the users (e.g., posting messages, checking in status, uploading and sharing videos and photos, reviewing products, commenting on various topics).

Languages are fluid and evolve over time. New words are created or migrate from one language to another. Existing words may pick up new meanings or are used in new ways. On the other hand, some words may fall out of common usage as time passes. In particular embodiments, words are continuously collected from texts submitted by the users through various communication channels, and their usage frequencies in each communication category are updated from time to time. Within each communication category, as the words are sorted according to their respective usage frequencies, those words that are more popular among the users move up in rank while those words that are less frequently used move down in rank. By selecting the top n most frequently used words from each communication category for blending to create the customized dictionaries, the resulting dictionaries include those words frequently used by the users at any given time. In particular embodiments, the customized dictionaries may be updated from time to time to reflect any change in word usage or the current state of word usage among the users. Consequently, the customized dictionaries are dynamic and do not suffer those limitations associated with traditional or standard dictionaries. For example, words such as "computer", "multimedia", "Internet", "blog" are commonly used by users from different parts of the world who speak different languages. Thus, their usage frequencies may be high even among texts submitted by non-English-speaking users. When creating a customized dictionary for German-speaking users, it may include these English words as well. As a result, a customized dictionary may include words from multiple languages. As another example, with mobile device users, new trendy words may appear and quickly gain popularity among the users. As a new word becomes more and more popular among the users, its usage frequency increases accordingly. The word may be included in the customized dictionaries as it becomes sufficiently popular among the users, even though it does not exist in traditional dictionaries.

In particular embodiments, when a customized dictionary is created or updated, it may be sent to the user or users (e.g., pushed to the user's device) for whom the customized dictionary is created. Software functions that rely on a dictionary may use this customized dictionary instead of the standard dictionary.

As described above, in particular embodiments, any number of customized dictionaries may be constructed for a user. Different customized dictionaries may be suitable for different types of input devices, different communication channels, different forms of communications, different recipients, and so on. In addition, in particular embodiments, the words included in the customized dictionaries constructed for a specific user may be selected based in part on the information known about the user, such as the user's demographical information (e.g., age, gender, professions, education, location, hobbies and interests, etc.), the user's social connections (e.g., the names of the user's friends, families, colleagues, etc.), locations the user likes to visit (e.g., the names of the bars or restaurants the user prefers), the activities the user likes to do, etc. For example, if the user is from or lives on the East Coast of the United States, the customized dictionaries may include more words commonly used by people from the East Coast. If the user is from or lives in one of the Southern states of the United States, the customized dictionaries may include more words commonly used by the people from the South. As another example, if, among the user's social connections at a social-networking website, the following people are known to be close social connections of the user: Paula Smith, Andrew Jones, Mary Jackson, and Henry Brown. A customized dictionary constructed for this user (e.g., especially one for use when the user sends messages to his or her friends) may include those specific names of the user's close social connections (e.g., Paula, Andrew, Mary, and Henry), even if those names are not among the most frequently used words found in the texts submitted by the users in general. As a third example, if the user is fluent in multiple languages and uses words from multiple languages in his or her speech, a customized dictionary may include words from several languages used by the user.

In particular embodiments, if there is little or no information known about a user, a default customized dictionary may initially be utilized for the user. In some implementations, the default customized dictionary may be an average blending of the most frequently used words from various communication categories. Thereafter, as more information becomes known about the user (e.g., the names of the user's social connections, the user's hobbies and interests, the user's speech pattern, etc.), the customized dictionary may be updated from time to time to reflect the new information known about the user (e.g., adding the names of the user's social connections or the words the user likes to use in his or her speech to the customized dictionary).

In particular embodiments, the customized dictionaries constructed for a user may be utilized in aiding the user when the user inputs texts into electronic devices. FIG. 3 illustrates an example method for utilizing customized dictionaries in aiding a user in inputting texts. Suppose that one or more customized dictionaries have been constructed for a user. Thereafter, the user may input text to an electronic device, as illustrate in STEP 310. In response, a customized dictionary constructed for the user may be selected for use in aiding the user in inputting the text, as illustrated in STEP 320. If there is only one customized dictionary constructed for the user, that customized dictionary may be selected. On the other hand, if there are multiple customized dictionaries constructed for the user, in particular embodiments, one of these customized dictionaries may be selected.

In some implementations, the customized dictionary may be selected based on factors such as, for example and without limitation, the type of electronic device used by the user to input the text, the recipients for receiving the inputted text, and the form of communication embodied by the inputted text. For example, if the electronic device used by the user is a mobile device, as opposed to, for example, a non-mobile device, the selected customized dictionary may be more suitable for use with mobile devices (e.g., a mobile device that does not have a full-size keyboard). In this case, the customized dictionary may include more shorthand words or word abbreviations. As another example, if the recipient of the inputted text is a friend of the user's, as opposed to, for example, the user's professional colleagues, the customized dictionary may include more words or colloquialisms frequently shared among the user and his or her friends. On the other hand, if the recipient of the inputted text is the user's supervisor at work, the customized dictionary may include more words especially related to the user's profession or work (e.g., if the user is an electronic engineer, the selected customized dictionary may include more technical terms in the field of electronic engineering). As a third example, if the inputted text relates to the user composing a document or e-mail, the selected customized dictionary may include more words that are more suitable for the content of the document or e-mail (e.g., formal words). On the other hand, if the inputted text relates to the user sending a text message, the selected customized dictionary may include more word abbreviations commonly found in text messages. One or more factors may be considered when selecting a customized dictionary for the user, and the customized dictionary may be selected on any level of granularity. For example, on a more granular level, the selected customized dictionary may be suitable for the user when inputting text to the user's mobile telephone for sending messages to the user's close friends.

In particular embodiments, the selected customized dictionary may be utilized in aiding the user in inputting the text, as illustrated in STEP 330. In some implementations, the selected customized dictionary may be used with functionalities such as, for example and without limitation, spelling and grammar checking, automatically completing a word (i.e., auto completion), automatically replacing an incorrect (e.g., misspelled) word (i.e., auto correction), suggesting word choices or alternatives. Words may be selected from the customized dictionary and suggested to the user. Since the customized dictionary is especially constructed for the user, the words selected from such a dictionary, as opposed to, for example, a standard dictionary, may be more suitable to the user's personal preference and needs.

For example, suppose that the user starts typing the letters "co" into his or her electronic device. Words may be selected from the customized dictionary based on the already inputted letters "co" (e.g., words that start with "co"). When suggesting words to the user as choices for completing the word the user is typing, if the user is an artist, the word "color" may be ranked higher in this user's customized dictionary and thus selected for suggestion to the user. In contrast, with a non-customized standard dictionary, the word "cow" may be selected randomly and suggested to the user, which may be less likely the word the user means to type.

As another example, words may be suggested to the user (e.g., for auto completion or correction) based on the intended recipients of the inputted text. Suppose that the user starts typing the letters "da" into his or her electronic device. If the user is composing an e-mail to his or her father, the word "dad" may be selected from the customized dictionary and suggested to the user for completing the word input. If the user is composing a text message to his or her spouse, the word "darling" may be selected from the customized dictionary and suggested to the user. Furthermore, the word "darling" may be automatically inserted into the text-input field if the user typically addresses his or her spouse in such a manner. On the other hand, if the user is composing a blog message to be posted at a website for read by the general public, as opposed to, for example, a specific recipient, the word "dark" may be suggested to the user.

As a third example, suppose that the user is working on a document and has typed in a misspelled word "cirkiut". Further suppose that the user is an electronic engineer, and thus, the customized dictionary constructed for this user includes technical terms commonly used in the field of electronic engineering. In some cases, the word "circuit" may be selected from the user's customized dictionary and suggested to user as a correction for replacing the misspelled word "cirkiut". Alternatively, in other cases, the misspelled word "cirkiut" may be automatically replaced by the correctly-spelled word "circuit".

In particular embodiments, a machine-learned model may be used to help improve the selections of words for aiding users in inputting texts. Machine learning is a scientific discipline that is concerned with the design and development of algorithms that allow computers to learn based on data. The computational analysis of machine learning algorithms and their performance is a branch of theoretical computer science known as computational learning theory. The desired goal is to improve the algorithms through experience (e.g., by applying the data to the algorithms in order to "train" the algorithms). The data are thus often referred to as "training data". With customized dictionaries, a machine-learned model may be trained to help improve the construction of the customized dictionaries for the individual users (e.g., which words to include in which customized dictionary for which user) as well as selecting specific words from a customized dictionary in aiding a specific user when inputting texts.

For example, suppose that when the user starts typing the letters "co" into his or her electronic device, the following words are selected from the user's customized dictionary and suggested to the user in the following order: "color", "company", "cold", "concert" and "college". Further suppose that even though the word "color" is the first word suggested to the user, the user actually chooses the word "concert" to complete the word input. If this happens a few times, the machine-learned model may be trained to take the user's selections as feedback. Subsequently, when the user types the letters "co" again, the word "concert" may be suggested to the user as the first choice (e.g., instead of "color").

Currently, each different software application may have its own dictionary. For example, Microsoft Word has a dictionary for use with spelling and grammar checking. The Google search engine has its own dictionary for suggesting words as search queries or for correcting misspelled words submitted in search queries. As another example, when a desktop application is installed on multiple electronic devices, there is a different copy of the dictionary used by the desktop application stored on each electronic device. Consequently, even if a user can customize one copy of the dictionary associated with a desktop application stored on one electronic device, the customization is not automatically reflected in other copies of the dictionary stored on the other electronic devices. Web-based applications typically do not allow individual users to customize their dictionaries.

In particular embodiments, when customized dictionaries are constructed for a user, the same customized dictionaries may be utilized in connection with any software operation provided by any software application performed on any electronic device. Consequently, the user does not need to deal with multiple versions of dictionaries, but may have a consistent experience in terms of inputting texts for various purposes.

Often, a user may have multiple electronic devices, which the user uses under different circumstances. The user may have a computer in his or her office, which the user uses at work, and another computer at home, which the user uses for personal activities. The user may have a mobile device (e.g., a mobile telephone), which the user carries around with him or her and uses whenever needed. In some cases, the user may perform the same software operation (e.g., searching information on the Internet using a search engine, sending e-mails) using any one of these devices. In other cases, there may be different software applications installed on different devices (e.g., a project-management application installed on the user's work computer, a word processor installed on the user's home computer, and a chat application installed on the user's mobile device). In particular embodiments, the customized dictionaries may be used to aid the user in inputting texts regardless of which electronic device or which software application on which electronic device the user uses.

Suppose that a set (e.g., one or more) of customized dictionaries has been constructed for the user. Each customized dictionary in the set may be a different blending of the most frequently used words from various communication categories (as described above), and may be suitable for use with different software operations or on different types of devices. These dictionaries are constructed for the user, taking into consideration factors such as the user's preferences, interests, demographic information, social connections, etc. Thus, the customized dictionaries include words more suitable to the user's needs than, for example, a standard dictionary.

As one example, when the user inputs text on one electronic device, one of the customized dictionaries from the set may be selected to aid the user in inputting the text. When the user inputs text on another, different electronic device, again, one of the customized dictionaries from the set may be selected to aid the user in inputting the text. In this case, a dictionary is selected from the same set of customized dictionaries constructed for the user, which ensures that the dictionary used is more suitable to the user's needs. In either case, the customized dictionary may be selected from the set based on factors such as the type of device used by the user for inputting the text, the software application involved, the type of communication, etc. If the first electronic device is the user's desktop computer at work, the dictionary selected may include words that are more suitable for professional communications or in the user's professional field. If the second electronic device is the user's mobile telephone, the dictionary selected may include shorter or abbreviated words that are more suitable for casual communications or easy to input into a device that does not have a full-size keyboard.

As another example, the user may search the Internet or send e-mails through multiple electronic devices. To provide a more consistent experience, the same customized dictionary may be used whenever the user inputs texts as search queries into a search engine, regardless of which web browser or which electronic device is used for conducting the search. Thus, when the user types "co" into the Google search engine using Microsoft Internet Explorer executing on the user's home computer, the word "concert" may be suggested to the user. Similarly, when the user types "co" into the Yahoo search engine using Mozilla Firefox executing on the user's mobile telephone, the word "concert" may again be suggested to the user. By using the same customized dictionary, it ensures that those words that are more applicable to this user's needs are suggested to the user. Similarly, the same customized dictionary may be used whenever the user composes e-mails, regardless of which e-mail applications (e.g., Microsoft Outlook or Mozilla Thunderbird) or which electronic device (e.g., the user's computer at work or at home) is used for sending the e-mails. Thus, whenever the user sends an e-mail his father, regardless of which e-mail application or which device the user is using, when the user types "da", the word "dad" is always suggested to the user.

As a third example, as described above, a customized dictionary created for a user may include words especially applicable to the user's circumstances, such as the names of the user's friends and families or words commonly used in the user's professional field. Such a customized dictionary may replace the standard dictionaries provided by various desktop or web-based software applications. Consequently, when the user uses any software application on any device, the same customized dictionary is used and those words especially applicable to the user's circumstances are always available to the user.

As a fourth example, often, the same software application may be installed on different electronic devices (e.g., a web browser may be installed on any network-capable electronic device). In addition, a copy of the customized dictionaries constructed for a user may also be stored on each electronic device associated with the user. When the user conducts searches on the Internet using a web browser on a first electronic device, a customized dictionary stored on the first electronic device may be used to aid the user in conducting the searches. When the user conducts searches on the Internet using a web browser on a second electronic device, again, a customized dictionary stored on the second electronic device may be used to aid the user in conducting the searches. Since in both cases, the user is conducting searches on the Internet, the selected customized dictionary on the first electronic device and the selected customized dictionary on the may be two copies of the same customized dictionary. Consequently, regardless of which electronic device the user uses to conduct the searches on the Internet, the words provided by the selected customized dictionary may be the same or similar, thus providing a consistent experience, in terms of the dictionary-related features, to the user.

In particular embodiments, the customized dictionaries constructed for a user may be associated with the user and "follows" the user as the user inputs texts in connection with different software operations. The steps illustrated in FIG. 3 may be similarly applied regardless of which software operation is involved or which electronic device is used. This ensures that the user has a consistent experience with respect to dictionary-related functionalities.

In particular embodiments, if there are multiple electronic devices associated with a user, the customized dictionaries constructed for the user are sent to each of these electronic devices, so that they are available for use in aiding the user in inputting texts regardless of which electronic device the user uses. In addition, there any of these customized dictionaries is updated, the updated customized dictionary is sent to each electronic device associated with the user.

In particular embodiments, if a user is a member of a social-networking system, copies of the customized dictionaries constructed for the user may be stored with the social-networking system for the user. When the user performs any activity that may need a dictionary, the social-networking system may provide a suitable customized dictionary to the device used by the user.

Alternatively or in addition, in particular embodiments, a copy of each customized dictionary constructed for a user may be stored on each electronic device associated with the user. When the user performs any activity that may need a dictionary through any electronic device, the copy of the dictionary stored on that device may be used. In this case, when the user's customized dictionaries are updated, copies of the updated customized dictionaries may be pushed to each electronic device associated with the user for storage and subsequent usage when needed.

In particular embodiments, suppose that a user is a member of a social-networking system and copies of the customized dictionaries constructed for the user are stored with the social-networking system for the user. If the user is performing actions using an electronic device, which needs a dictionary, and the user's customized dictionaries are not available on this electronic device (e.g., copies of the user's customized dictionaries have not been sent to and stored on this electronic device), the electronic device may send a request to the social-networking system, and optionally with some authentication information. Upon successfully authenticating the user or the device, the social-networking system may send copies of the user's customized dictionaries to the electronic device for storage and use by the user.

In addition, in particular embodiments, an electronic device, which already has copies of the user's customized dictionaries, may, from time to time or as needed, send a request to the social-networking system to check if the copies of the user's customized dictionaries currently available on the device are update to date (e.g., the most recent versions of the user's customized dictionaries based on the dictionaries' construction dates). If not, the social-networking system may send copies of the last versions of the user's customized dictionaries to the electronic device for storage and use by the user.

Figure 4:
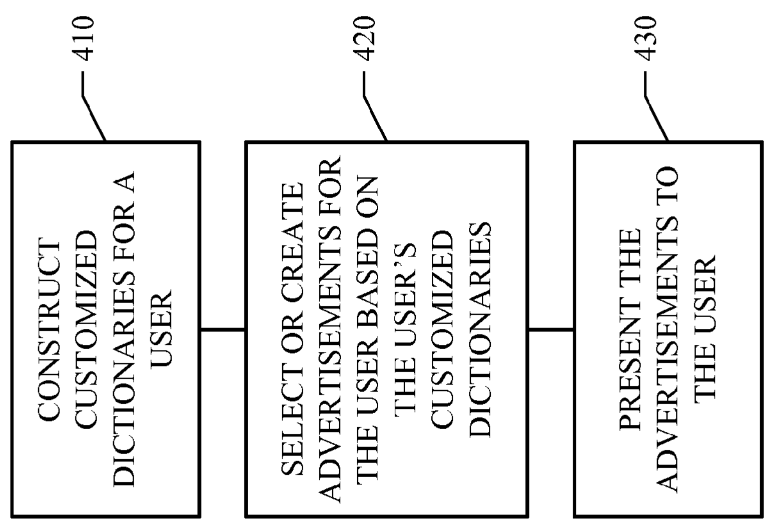
FIG. 4 illustrates an example method for presenting advertisements to a user based on the user's customized dictionaries.

In particular embodiments, when a user or a group of users has customized dictionaries, advertisements especially applicable to the user or group of users may be selected or constructed for the user or group of users based on the user's customized dictionaries. FIG. 4 illustrates an example method for presenting advertisements to a user based on the user's customized dictionaries. Although this method illustrates presenting customized advertisements to individual users, it may be similarly applied to present customized advertisements to individual groups of users sharing the same customized dictionaries.

In particular embodiments, a set of customized dictionaries may be constructed for a user, as illustrated in STEP 410. This may be achieved using the process illustrated in FIG. 2. The words included in each customized dictionary may be especially suitable to the user's particular circumstances. For example, as described above, there may be words that are most frequently used by users for specific communication devices and channels; there may be words applicable to the user's social circumstances (e.g., the names of the user's friends and families) or professional circumstances (e.g., the words especially applicable to the user's professional fields); there may words reflecting the user's hobbies and interests; and so on.

Advertisements may be constructed or selected for the user based on the words included in the user's customized dictionaries, as illustrated in STEP 420. For example, if the word "iPhone" is included in one of the user's customized dictionaries, an advertisement about iPhone or other similar models of smartphones may be selected for the user. If the word "safari" is included in one of the user's customized dictionaries, an advertisement on vacationing packages to a popular safari destination (e.g., Kenya) may be selected for the user.

In particular embodiments, a customized dictionary created for a user may include tenths of thousands of words. When selecting customized advertisements for the user based on the words included in the user's customized dictionary, those words most frequently used by the user may be considered. For example, if the user often uses the word "hiking", this may suggest that the user is interested in this particular activity. Thus, customized advertisements on hiking shoes, hiking apparels, or hiking equipments may be selected for the user.

In particular embodiments, the advertisements may be selected further based on the specific activity the user is conducting, which utilizes the help of a customized dictionary. As an example, suppose that the user is conducting a search on the Internet by submitting search queries to a search engine. Further suppose that as the user types "pl", several words staring with "pl" are selected from one of the user's customized dictionaries and suggested to the user (e.g., for auto completion) and the user selects the word "plasma". Based on this user selection, an advertisement on plasma TV may be selected for the user. In this case, the word selected by the user from those words suggested to the user may relate to a product or service, and any number of customized advertisements relating to this product or service may be selected for and presented to the user.

In particular embodiments, the advertisement specifically selected for the user may be presented to the user, as illustrated in STEP 430. In the example with the advertisement on plasma TV, the advertisement may be included in the web page that is dynamically created to include the search results and presented to the user when the web page is presented to the user. In other saturations, advertisements may be sent to the electronic device currently used by the user so that they may be presented to the user at appropriate times. For example, when the user posts a blog message discussing popular safari destinations, an advertisement on vacationing packages to a popular safari destination may be presented to the user after the user submits the post.

Figure 5:
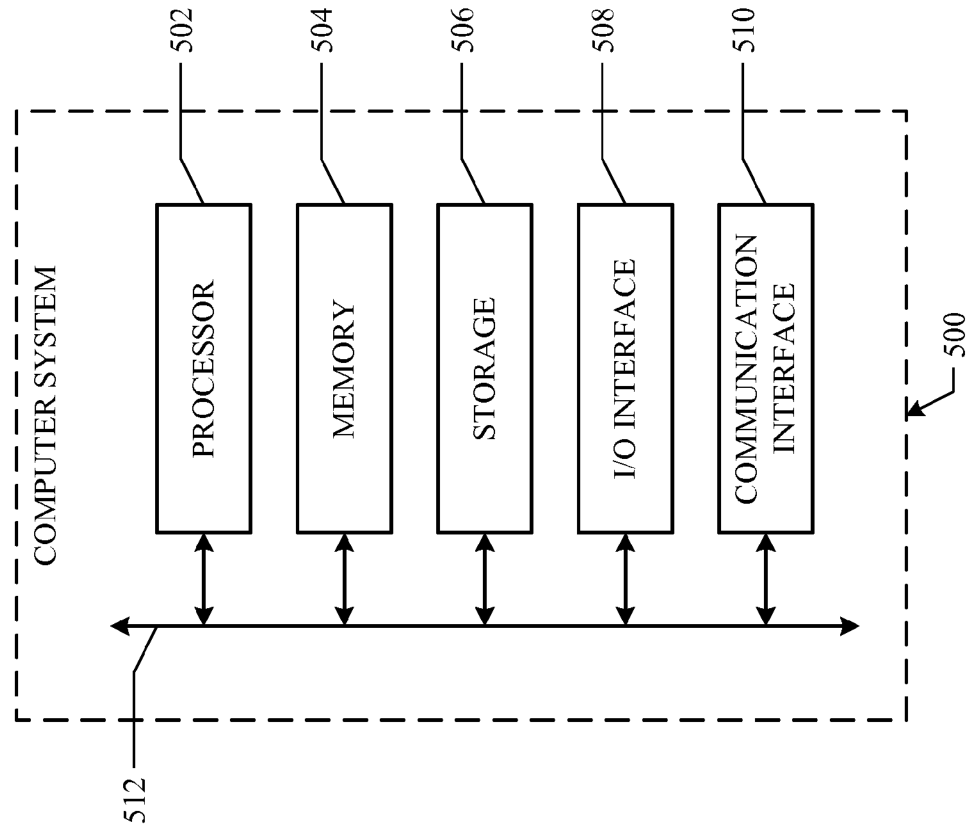
FIG. 5 illustrates an example computer system.

In particular embodiments, The methods illustrated in FIGS. 2, 3, and 4 may be implemented as computer software stored in one or more computer-readable non-transitory storage media. In particular embodiments, the methods illustrated in FIGS. 2, 3, and 4 may be performed by one or more computing devices (e.g., computers, mobile telephones, consoles, etc.). For example, the method may be implemented as computer software stored in one or more computer-readable storage non-transitory media and executed by a processor. FIG. 5 illustrates an example computer system.

In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, reference to computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy disks, floppy disk drives (FDDs), magnetic tapes, holographic storage media, solid-state drives (SSDs), RAM-drives, SECURE DIGITAL cards or drives, one or more other suitable computer-readable non-transitory storage media, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, performed by one or more computing devices, comprising:

by one or more computer servers, collecting a plurality of words from texts submitted by a user;

by one or more computer servers, for each of a plurality of communication categories, determining a usage frequency of each of one or more of the words within the communication category; wherein each of the communication categories is characterized by at least one communication channel, wherein the at least one communication channel comprises an input device used for submitting the texts; and by the one or more computer servers, constructing one or more customized dictionaries that each comprise a blending of selected words from the plurality of words from texts submitted by the user, a first customized dictionary being associated with a first type of input device and a second customized dictionary being associated with a second type of input device, the first customized dictionary being distinct from the second customized dictionary, the second type of input device different than the first type of input device, the construction of the one or more customized dictionaries comprising:

for each of the customized dictionaries, by the one or more computer servers, selecting one or more frequently used words from each of one or more of the communication categories based on the usage frequency of each of one or more of the words;

by the one or more computer servers, determining a specific blending of the frequently used words selected from each of the communication categories; and by the one or more computer servers, blending the frequently used words selected from each of the communication categories to construct the customized dictionary.

2. The method of claim 1, further comprising:

for each of the plurality of communication categories, sorting the plurality of words based on the usage frequency of each of the words within the communication category; and constructing a usage-frequency table that comprises the communication categories and the frequently used words from each of the communication categories.

3. The method of claim 1, wherein constructing one of the customized dictionaries comprises:

determining a coefficient for each of the communication categories; and blending the frequently used words from each of the communication categories based on the coefficient of each of the communication categories.

4. The method of claim 1, further comprising:

discarding from the plurality of words one or more undesirable words; and adding to the plurality of words one or more desirable words.

5. The method of claim 1, wherein:

the customized dictionaries are constructed for one or more particular users respectively; and for each of the customized dictionaries, the blending of the frequently used words from each of the communication categories is determined based on the corresponding user.

6. The method of claim 1, wherein:

the customized dictionaries are constructed for one or more groups of users respectively; and for each of the customized dictionaries, the blending of the frequently used words from each of the communication categories is determined based on the corresponding group of users.

7. The method of claim 1, wherein:

the customized dictionaries are constructed for one or more communication channels respectively; and for each of the customized dictionaries, the blending of the frequently used words from each of the communication categories is determined based on the corresponding communication channel.

8. The method of claim 1, further comprising:

monitoring additional texts submitted by the users;

for each of the communication categories, updating the usage frequencies of the words in the communication category based on the additional texts; and updating the customized dictionaries based on the updated usage frequencies.

9. The method of claim 1, wherein:

the texts are received through one or more communication channels that each comprise one or more communication dimensions; and each of the communication categories represents a unique pair of communication dimensions.

10. The method of claim 9, wherein:

the communication channels comprise one or more of mobile input device, non-mobile input device, chat, e-mail, message, comment, status update, post, or communication object; and the communication dimensions comprise one or more of locale, language, geography, culture, user friend list, or communication method.

11. A system comprising:

a memory comprising instructions executable by one or more processors; and the one or more processors coupled to the memory and operable to execute the instructions, the one or more processors being operable when executing the instructions to:

collect a plurality of words from texts submitted by a user;

for each of a plurality of communication categories, determine a usage frequency of each of one or more of the words within the communication category, wherein each of the communication categories is characterized by at least one communication channel, wherein the at least one communication channel comprises an input device used for submitting the texts; and construct one or more customized dictionaries that each comprise a blending of selected words from the plurality of words from texts submitted by the user, a first customized dictionary being associated with a first type of input device and a second customized dictionary being associated with a second type of input device, the second type of input device different than the first type of input device, the first customized dictionary being distinct from the second customized dictionary, the construction of the one or more customized dictionaries comprising:

for each of the customized dictionaries, select one or more frequently used words from each of one or more of the communication categories based on the usage frequency of each of one or more of the words;

determine a specific blending of the frequently used words selected from each of the communication categories; and blend the frequently used words selected from each of the communication categories to construct the customized dictionary.

12. The system of claim 11, wherein construct one of the customized dictionaries comprises:

determine a coefficient for each of the communication categories; and blend the frequently used words from each of the communication categories based on the coefficient of each of the communication categories.

13. The system of claim 11, wherein:

the customized dictionaries are constructed for one or more particular users respectively; and for each of the customized dictionaries, the blending of the frequently used words from each of the communication categories is determined based on the corresponding user.

14. The system of claim 11, wherein:

the customized dictionaries are constructed for one or more groups of users respectively; and for each of the customized dictionaries, the blending of the frequently used words from each of the communication categories is determined based on the corresponding group of users.

15. The system of claim 11, wherein:

the customized dictionaries are constructed for one or more communication channels respectively; and for each of the customized dictionaries, the blending of the frequently used words from each of the communication categories is determined based on the corresponding communication channel.

16. One or more non-transitory computer-readable storage media embodying software operable when executed by one or more computer systems to:

collect a plurality of words from texts submitted by a user;

for each of a plurality of communication categories, determine a usage frequency of each of one or more of the words within the communication category, wherein each of the communication categories is characterized by at least one communication channel, wherein the at least one communication channel comprises an input device used for submitting the texts; and construct one or more customized dictionaries that each comprise a blending of selected words from the plurality of words from texts submitted by the user, a first customized dictionary being associated with a first type of input device and a second customized dictionary being associated with a second type of input device, the second type of input device different than the first type of input device, the first customized dictionary being distinct from the second customized dictionary, the construction of the one or more customized dictionaries comprising:

for each of the customized dictionaries, select one or more frequently used words from each of one or more of the communication categories based on the usage frequency of each of one or more of the words;

determine a specific blending of the frequently used words selected from each of the communication categories; and blend the frequently used words selected from each of the communication categories to construct the customized dictionary.

17. The non-transitory computer-readable storage media of claim 16, wherein construct one of the customized dictionaries comprises:

determine a coefficient for each of the communication categories; and blend the frequently used words from each of the communication categories based on the coefficient of each of the communication categories.

18. The non-transitory computer-readable storage media of claim 16, wherein:

the customized dictionaries are constructed for one or more particular users respectively; and for each of the customized dictionaries, the blending of the frequently used words from each of the communication categories is determined based on the corresponding user.

19. The non-transitory computer-readable storage media of claim 16, wherein:

the customized dictionaries are constructed for one or more groups of users respectively; and for each of the customized dictionaries, the blending of the frequently used words from each of the communication categories is determined based on the corresponding group of users.

20. The non-transitory computer-readable storage media of claim 16, wherein:

the customized dictionaries are constructed for one or more communication channels respectively; and for each of the customized dictionaries, the blending of the frequently used words from each of the communication categories is determined based on the corresponding communication channel.

* * * * *